May 15, 1923.
J. CORGIAT, JR., ET AL
1,455,242
COUPLING
Filed Dec. 28, 1920
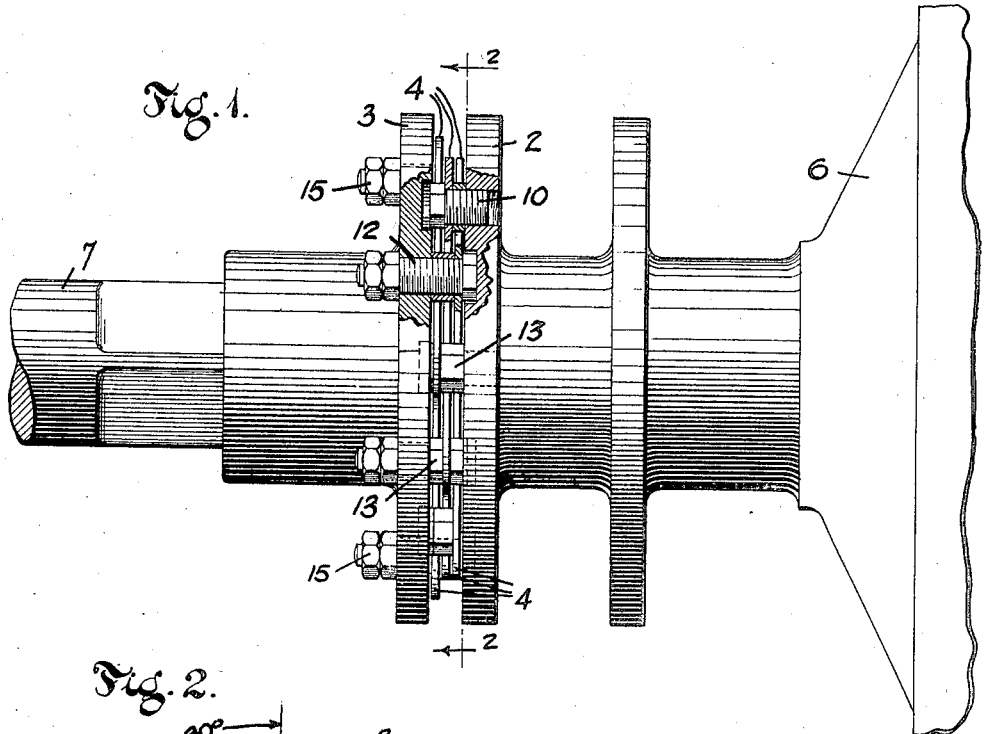
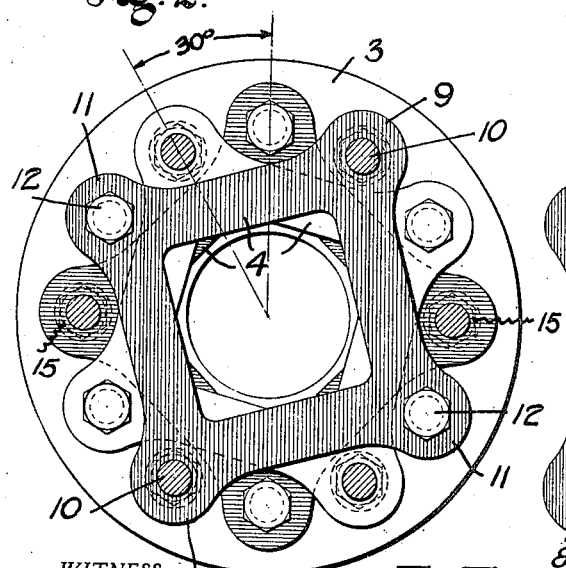
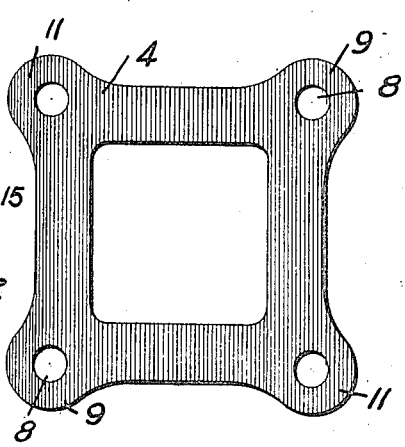
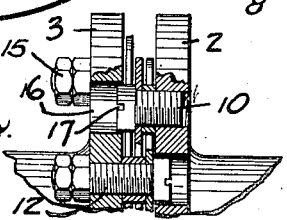
WITNESS
H. Sherburne
INVENTOR
AND JOHN CORGIAT JR.
JULIUS J. DUSEVOIR
BY White Prost r Evans
their ATTORNEYS Patented May 15, 1923.

1,455,242

UNITED STATES PATENT OFFICE.

JOHN CORGIAT, JR., AND JULIUS J. DUSEVOIR, OF OAKLAND, CALIFORNIA, ASSIGNORS TO STAR MOTOR COMPANY OF CALIFORNIA, OF OAKLAND, CALIFORNIA, A CORPORATION OF CALIFORNIA.

COUPLING.

Application filed December 28, 1920. Serial No. 433,647.

*To all whom it may concern:*

Be it known that we, JOHN CORGIAT, Jr., and JULIUS J. DUSEVOIR, citizens of the United States, and residents of Oakland, county of Alameda, and State of California, have invented a new and useful Coupling, of which the following is a specification.

Our invention relates to couplings and one of the objects of the invention is to provide a very light coupling means of especial value in automobile construction where there is need of a coupling which does not add momentum in material degree to the revolving parts, because of its extreme lightness. Another object of our invention is the provision of a coupling which possesses sufficient flexibility to compensate for lack of exact alinement in the connected parts. Still another object of our invention is the provision of a coupling which may be inserted in a very small space, for instance, ¼ inch in width.

Our invention possesses other objects and features of advantage, some of which, with the foregoing, will be set forth in the following description of our invention. It is to be understood that we do not limit ourselves to the showing made by the said description, as we may adopt variant forms of our invention within the scope of the claims.

In the drawings: Fig. 1 is a side elevation of our coupling as interposed between the cone member of the clutch and the transmission shaft. Fig. 2 is a vertical sectional view, the plane of section being indicated by the line 2—2 of Fig. 1. Fig. 3 is a plan view of one of the connecting links. Fig. 4 is a fragmentary view in elevation showing a modified structure.

Because of the fact that the motor and transmission of an automobile are separate units and subjected to widely varying stresses, there is a certain tendency toward lack of axial alinement, which is usually cared for by the use of a universal or toggle joint. Such joints require a certain measure of attention, adjustment, and renewal of parts, and lubrication. Furthermore they are of considerable weight and hence to overcome their momentum when operating the parts, a clutch brake may be required. This involves still other mechanism demanding more or less attention.

The requirement for a universal joint makes it impracticable to short couple the transmission to the motor, which is a desirable construction since the further apart these two units are the greater their tendency to misalinement thru flexure in the frame. Our coupling obviates all of these difficulties and solves certain structural problems which have been a source of earnest study by designers of a certain type of motor vehicle. It is so light, that its momentum is negligible, it provides the flexibility to compensate for axial misalinement of the coupled parts so that vibration, defective clutch action and other attendant evils are avoided, and the space required is so small that it can be interposed at any desired point between the driven and driving elements.

Our coupling comprises a pair of flange plates 2 and 3 between which the thin flexible connecting members 4 are interposed. The flange plate 2 may be assumed to be connected to the cone 6 of the clutch mechanism, and the flange plate 3 to be slidably mounted on the squared end of the transmission shaft 7. Thus the entire coupling moves longitudinally with the cone member of the clutch. This is the preferred arrangement when our device is installed in a transmission mechanism such as that of the Chevrolet automobile, but we may interpose our coupling at other points in the transmission system, or between the ends of alined shafts wherever its peculiar qualities make its use desirable.

The connecting members or links 4 are preferably shaped as shown in Fig. 3, broadly polygonal, and preferably square in outline, apertured in the center to reduce weight and provided with corner extensions provided with holes 8 for the fastening pins. Three of such members are preferably used in the relation shown in Fig. 2, that is, one pair 9 of diametrically opposite corners is secured by pins 10 to the flange plate 2, and the other pair of corners 11 is similarly secured by pins 12, to the other flange plate 3. The three links are angularly evenly spaced about the rotational axis of the coupling, the adjacent fastening pins lying 30° apart and in a circle concentric with the axis. A small space, say about $\frac{1}{32}''$ separates the links from each other and from the flange plates. The fastening pins are alternately set in each flange plate, so that the torsional stresses are evenly applied. Since the ends of the links secured by the fastening pins lie at varying distances from the flange plates, washers 13 of the requisite thickness are utilized so that each link is rigidly fastened to each flange plate in two places without flexure out of its normal plane if the flange plates are parallel and in alinement. Thus so far as rotational stresses are concerned, the flange plates are rigidly connected whether the driving stress be from clutch to transmission shaft or in the opposite direction, as when braking on the engine. As to other stresses, the flexible nature of the connecting members or links permits perfect adaptation or compensation for misalinement within reasonable limits.

In assembling the coupling, the pins 12 which are bolts having relatively thin heads are inserted in the connecting links and laid head down on the flange plate 2. The flange plate adjacent the heads is countersunk appropriately so that the heads do not engage the plate. Pins 10 which are cap screws having relatively thin heads are then inserted with washers of the required thickness below the corners of the links, and threaded firmly in the flange plate 2. Washers comprising nuts of the proper thickness, are then threaded over the upstanding bolts 12 and tightened down to rigidly fix the bolts in the links. The flange plate 3, also counter-sunk to receive the heads of the screws 10 which project far enough, is assembled thereon. Nuts 15 are then applied to the projecting ends of the bolts 12 to bind all together.

Since there are three links, there will be three different distances thru which the heads of the pins extend from the inner faces of the flange plates. Some of the heads which are thin will not extend into the recesses formed in the adjacent flange plate, but no account is taken of this, all of the recesses being formed, so that no special position of the links is required during assembly. If desired, we may still further contribute to the lightness of our coupling by forming recesses 16, Fig. 4, thru each flange plate opposite the heads of the pins set in the other flange plate. In this case, assembly of parts may be facilitated by slots 17 in the heads of the fastening pins, into which a screw driver may be set thru the alined recesses.

We claim:

1. A coupling comprising spaced flange plates, and a series of flexible polygonal links, each link being separately secured at certain points to one of said flange plates and at intervening points to the other flange plate.

2. A coupling comprising spaced flange plates, a series of superposed links for connecting the flange plates, each link being in respect of the other links angularly spaced about the rotational axis of the coupling, and pins for separately securing successive points of each link alternately to each flange plate.

In testimony whereof, we have hereunto set our hands.

JOHN CORGIAT, Jr.
JULIUS J. DUSEVOIR.